US007070100B2

(12) United States Patent
Davie et al.

(10) Patent No.: US 7,070,100 B2
(45) Date of Patent: Jul. 4, 2006

(54) DESKTOP CARD PRINTER WITH EMBEDDED PCL, TELNET, AND USB HUB AND METHOD FOR USING SAME

(75) Inventors: Jeffrey A. Davie, Ham Lake, MN (US); Craig A. Lebakken, Edina, MN (US); Michael A. Morrison, Eagan, MN (US)

(73) Assignee: DataCard Corporation, Minnetonka, MN (US)

( * ) Notice: Subject to any disclaimer, the term of this patent is extended or adjusted under 35 U.S.C. 154(b) by 0 days.

(21) Appl. No.: 10/716,712

(22) Filed: Nov. 18, 2003

(65) Prior Publication Data

US 2005/0103843 A1    May 19, 2005

(51) Int. Cl.
 *G06K 7/00* (2006.01)
(52) U.S. Cl. .......................... 235/440; 347/4; 347/101
(58) Field of Classification Search ................ 235/440, 235/380; 358/1.1, 1.15; 347/4, 101
See application file for complete search history.

(56) References Cited

U.S. PATENT DOCUMENTS

| | | | |
|---|---|---|---|
| 5,886,726 A | | 3/1999 | Pawelka et al. |
| 5,980,011 A * | | 11/1999 | Cummins et al. ............... 347/4 |
| 6,292,270 B1 | | 9/2001 | Schwarz, Jr. et al. |
| 6,552,815 B1 | | 4/2003 | Schwarz, Jr. et al. |
| 6,733,103 B1 * | | 5/2004 | Murata ......................... 347/14 |
| 2002/0001495 A1 * | | 1/2002 | Mochizuki ................... 400/61 |
| 2002/0097414 A1 * | | 7/2002 | Utsunomiya ............... 358/1.13 |
| 2002/0180993 A1 * | | 12/2002 | Klinefelter et al. .......... 358/1.1 |
| 2003/0050899 A1 * | | 3/2003 | Tushie et al. ................. 705/65 |
| 2003/0090712 A1 | | 5/2003 | Lenz et al. |
| 2003/0197056 A1 * | | 10/2003 | Dunham et al. ............. 235/380 |
| 2004/0256451 A1 * | | 12/2004 | Goman et al. .............. 235/380 |
| 2005/0058482 A1 * | | 3/2005 | Meyerhofer ................. 400/76 |

OTHER PUBLICATIONS

"PCL" Webopedia article: www.webopedia.com, Jun. 21, 2002.*
"Printer Command Language(PCL): PCL5e HP Laserjet 4P" Internet article at http://printers.necsam.com/public/printers/pclcodes/pcl5hp.htm.*
Brain, M., "How USB Ports Work," http://computer.howstuffworks.com/usb.htm/printable, 6 pages (Date Printed Nov. 13, 2003).
"Ethernet Technologies," *Interworking Technologies Handbook*, Chapter 7, pp. 7-1-7-6 (Date Unknown).
Pidgeon, N., "How Ethernet Works," http://computer.howstuffworks.com/ethernet.htm/printable, 9 pages (Date Printed Nov. 13, 2003).

* cited by examiner

*Primary Examiner*—Daniel Stcyr
*Assistant Examiner*—Daniel A. Hess
(74) *Attorney, Agent, or Firm*—Hamre, Schumann, Mueller & Larson, P.C.

(57) ABSTRACT

A desktop card printer having an external communication link, a multi-platform standardized PDL controller in communication with the link, and at least one data writer in communication with the controller. The controller controls the data output of data writers. The controller may be a PCL® controller. The data writers may include one or more print heads for visible printing, magnetic write heads for writing to magnetic media, and smart card contacts for writing to embedded smart card chips. The printer may include one or more couplers in communication with one or more of the data writers, for converting information into a form usable by the data writer. The data link may be a USB or Telnet link. The printer may include an internal USB hub. Image processing and decision making may be performed primarily or entirely within the printer, in particular within the processor. The printer may be commanded by a dedicated host, such as a personal computer, or it may be connected to a network.

10 Claims, 5 Drawing Sheets

DESKTOP CARD PRINTER WITH EMBEDDED PCL, TELNET, AND USB HUB AND METHOD FOR USING SAME

BACKGROUND OF THE INVENTION

1. Field of the Invention

The invention relates to a desktop card printer, and a method for printing cards therewith. More particularly, the invention relates to a desktop card printer that includes embedded PCL® (Printer Control Language), Telnet Protocol, and an internal Universal Serial Bus (USB) hub.

2. Description of Related Art

Presently, cards of various sorts, such as identification cards, pass cards, credit cards, etc. are in wide use. Many such cards incorporate some form of data thereon or therein, such as textual or graphical printing, or information stored in a magnetic stripe on the card. More recently, it has become known to embed computer chips in cards to produce so-called "smart cards", and to record data and/or functional instructions or programs on the chips.

Often, it is desirable to customize the data stored on a card in some fashion. For example, an identification card might include the card-bearer's name and photograph. Alternatively, information about the bearer, access codes, etc. might be stored in magnetic stripes or in computer chips. A given card may include several types of data stored thereon.

Until relatively recently, the chief means for adding information to cards is through the use of large industrial-style machinery. Such machinery is suited to processing very large numbers of cards in a short period. However, as cards become common, smaller card printers have become desirable. Sometimes referred to as "desktop card printers", they typically are smaller, more mobile, and less expensive than industrial card printers. The use of desktop card printers can facilitate rapid and convenient production of cards in small batches or even singly.

However, conventional desktop card printers have several limitations.

For example, conventional desktop card printers often are used in conjunction with personal computers, in order to control the printers and provide a convenient vehicle for users to enter the data that is to be written on the cards. Computers used in such a role sometimes are referred to as "host" machines. In order for a host and a desktop card printer to communicate, they must have some common language.

Conventionally, languages used with desktop card printers are platform-specific. That is, they are designed to work only with a single operating system. In order to control a conventional desktop card printer with a personal computer that has an alternate operating system, additional software is required. For example, the appropriate printer drivers could be "ported" to the alternate operating system by rewriting and modifying their code.

The modifications necessary to use a platform-specific language on a different platform can interfere with the operating system, causing crashes or other problems. Even if this can be overcome, time and effort is required to produce and debug the new software.

In addition, conventional desktop card printers require much of the image handling work to be performed by the host computer. For example, if a photograph is provided to a conventional desktop printer, the host must instruct the printer whether the image itself is color or black and white, which print ribbon(s) should be used if the printer has the capability to print in multiple modes, etc. A single printing may require many such decisions.

The need for the host computer to handle the decision-making and image-processing functions can slow down printing, and/or occupy the host to such an extent that it cannot effectively perform other tasks (such as new data entry) while printing.

In addition, if the host computer is handling the decision-making and processing, the host may have to obtain specialized information about the printer and its status in order to do so. For example, certain inks may be useful only for cards made of certain materials. If a printer has several ink cartridges for different types of card, the host would have to "know" which is the proper ink cartridge for the type of card being printed. To obtain this information, the host would have to communicate with the card printer itself—perhaps further slowing down printing and host operation—or interrogate the host's operator. In the latter case, the level of skill required to operate the desktop card printer increases.

In addition to a common language, a host and a desktop card printer must share a communication protocol. Conventional desktop card printers commonly use a Universal Serial Bus, or USB connection. However, USB connections generally are possible only as direct links. That is, the host must be connected directly to the desktop card printer with a USB cable. This makes it difficult or impossible to use a conventional desktop card printer equipped only with a USB-port over a network, or otherwise from a distance beyond the reach of a standard USB cable.

Card printers may record data of several types. For example, as noted above a desktop card printer may record on a single card a visible image, data in a magnetic stripe, and data in a smart card chip. However, a desktop card printer with multiple data writers (i.e. a print head, a magnetic write head, and a smart card contact) must be able to control each of those data writers. In conventional desktop card printers, some or all of the data writers use independent communication connections, in addition to the main connection(s) for the printer as a whole. As a result, a single conventional card printer may include as many as five or more separate connections (i.e. USB cables). Installation and use of the card printer thus may become increasingly complex as more data writers are added. Although third-party hubs may be used to consolidate the connections, this may not be a sufficient solution, since in that case the hub itself also must be connected.

SUMMARY OF THE INVENTION

It is the purpose of the claimed invention to overcome these difficulties, thereby providing an improved desktop card printer, and a method for using the same.

As a preliminary matter, the following terms are defined.

The term "desktop card printer" as used herein to describe the present invention should be considered to mean a device suitable for desktop use, for disposing data on cards. Industrial card printers typically are much larger than desktop card printers. In addition, industrial card printers may be very different in structure, operation, and application from desktop card printers, and as such industrial card printers per se are not considered to be part of the present invention.

The term "printer" sometimes is used to refer specifically to a device for printing text or graphics, that is, visible images. However, with respect to the present invention the term "printer" refers more broadly to a device for deposition of data on a card. The type of data is not particularly limited. A printer may print text or graphics, but printing may include visible information that is neither pictorial nor textual, such as a bar code, in addition to or as an alternative to text and graphics.

Furthermore, recording information that is not necessarily visible to the human eye also may be considered printing for purposes of this application. For example, a desktop card printer may include a magnetic write head for recording magnetic data, either digital or analog; writing such data to the card is considered printing herein. Likewise, recording data to a computer chip embedded in a smart card also would be considered printing.

In addition, although the term "printer" sometimes is used to describe paper printers, a desktop card printer is not necessarily analogous in structure or function to a paper printer. Although certain terminology may be similar for paper and card printers, the devices themselves may not be similar. Therefore, unless otherwise noted herein, similarity or equivalence of a desktop card printer in accordance to the principles of the present invention to a paper printer should not be presumed.

As one instance, where paper printers typically print only on paper or on paper-like media, card printers may print on a very wide variety of media. Certain of these materials, such as many plastics, require the use of printing methods and/or inks that are very different from those used in paper printers. For example, while for color paper printers that use CYMK (cyan-yellow-magenta-black) colors, it may be equivalent to print black either as a combination of cyan, yellow, and magenta or as black. However, this is not necessarily true for card printers; therein, a combination of cyan, yellow, and magenta will not necessarily be equivalent to black. Thus, although a card printer may be used to print data that includes black, the manner in which this is done and the structure used to do it will not necessarily be equivalent, or even especially similar.

Similarly, it is noted that individual card printers may include several types of data writing devices, such as magnetic write heads, contacts for smart card chips, etc. in addition to print heads, while paper printers typically include print heads only.

Further information regarding such distinctions between paper and card printers is provided in the detailed description.

An exemplary embodiment of a desktop card printer in accordance with the principles of the present invention includes an external communication link for communication between the printer and external agencies, including but not limited to a host computer. The printer also includes a multi-platform standardized PDL (Page Description Language) controller in communication with the communication link, and at least one data writer in communication with the controller. The controller controls the data output of the data writer.

More particularly, the PDL controller may be a PCL® (Printer Control Language) controller.

Data writers may include print heads, magnetic write heads, and smart card contacts. The printer may include more than one data writer, with the controller controlling the data outputs of each.

When desktop card printer includes a smart card contact as a data writer, the printer may include a coupler. The coupler may be in communication with the controller, as well as with the smart card contact, such that the controller controls the data output of the contact via the coupler.

The desktop card printer may include more than one coupler, each of them in communication with the controller, such that the controller controls the data output of the smart card contact via a coupler selected from among several alternatives.

The data writers of the printer may include a first mode print head that prints in a first mode, and a second mode print head that prints in a second mode, wherein the first and second print modes are different. The first mode print head may be a dye sublimation printer, and the second mode print head may be a resin-ink surface printer.

Another exemplary embodiment of a desktop card printer in accordance with the principles of the present invention includes an external communication link for communication between the printer and external agencies, a multi-platform standardized PDL controller in communication with the communication link, and at least one data writer in communication with the controller. The controller controls the data output of the data writer. The communication link may be an Ethernet link, and the controller may be a Telnet controller.

Yet another exemplary embodiment of a desktop card printer in accordance with the principles of the present invention includes a Universal Serial Bus (USB) hub internal to the printer. The printer also includes a smart card contact, and two or more couplers. The couplers are in communication with the USB hub and the smart card contact. Via the USB hub, one coupler may be selected from among the couplers, and that coupler then may be used to control the data output of the smart card contact.

The USB hub may be electronically integrated into the desktop card printer.

An exemplary embodiment of a method of card printing in a desktop card printer in accordance with the principles of the present invention comprises the following. A controller of the printer is commanded from a host so that the host controls the controller, the commands being issued to the controller using a multi-platform standardized PDL. The commands from the host are interpreted with the controller, and the controller commands at least one data writer so as to control the data writer. Data then is written to a card in the card printer using the data writer.

The controller may be commanded using PCL®.

The data writers may include print heads, magnetic write heads, and smart card contacts.

The desktop card printer may include two or more data writers. In such case, the method may include selecting a data writer with the controller, commanding the selected data writer with the controller so as to control the selected data writer, and writing data to the card using the selected data writer.

Alternatively, if the desktop card printer includes two or more data writers, the method may include selecting first and second data writers with the controller, selectively commanding the selected data writers with the controller so as to selectively control them, and selectively writing data to the card with the selected data writers.

The method may include commanding a coupler in the printer with a host so as to control the coupler. The coupler interprets the commands from the host, and commands a smart card contact so as to control the smart card contact. The smart card contact then writes data to a card in the printer.

The method may include commanding the controller in the printer with a host via a USB hub internal to the desktop card printer, so as to control the controller, and commanding a coupler in the printer via the USB hub so as to control the coupler from the host. The coupler interprets the commands from the host, and commands a smart card contact so as to control the smart card contact. The smart card contact then writes data to a card in the printer.

The controller may be commanded via a network. The controller may be a Telnet controller, and the controller may be commanded using Telnet protocol.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
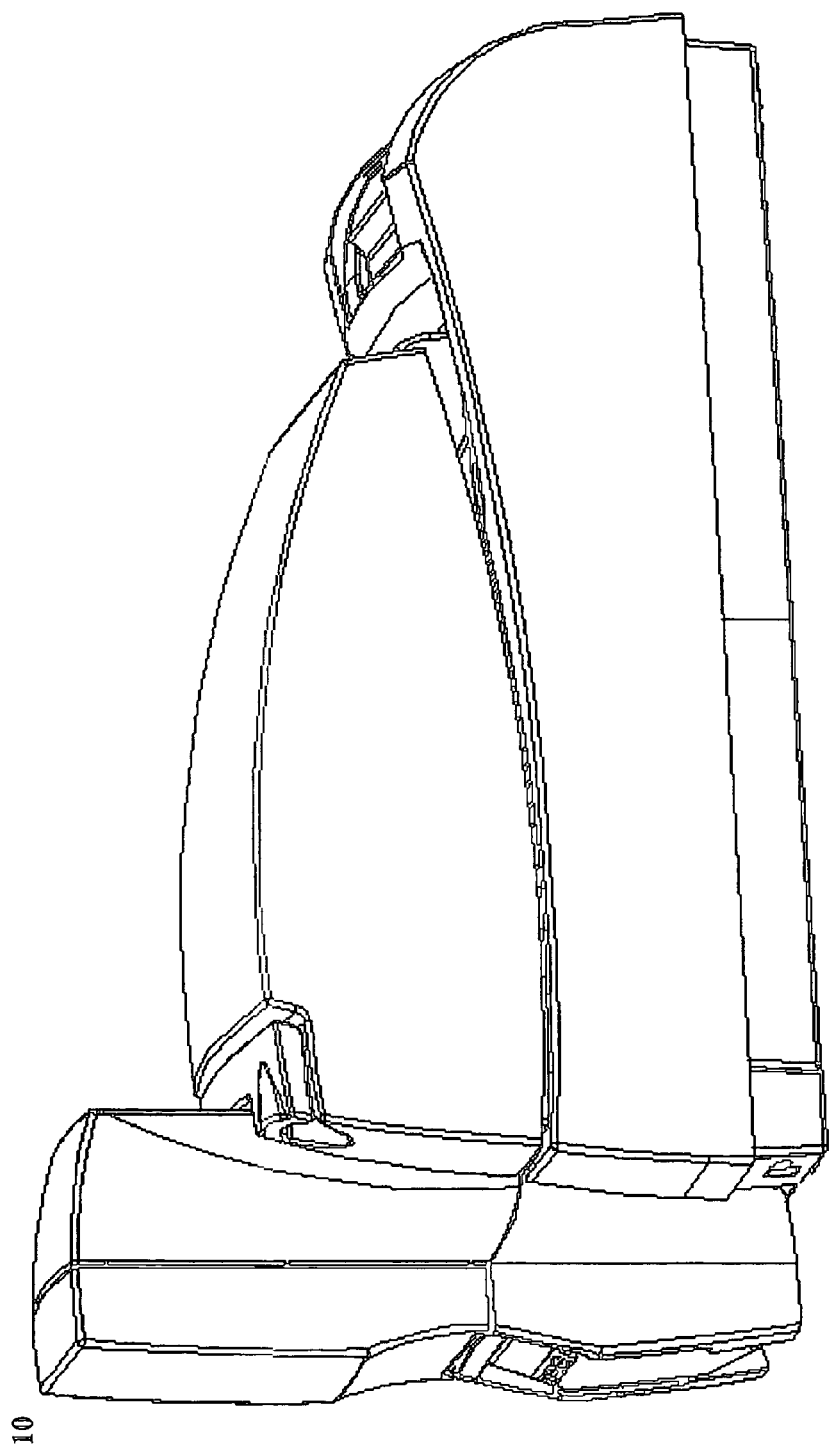
FIG. 1 shows a perspective illustration of an exemplary embodiment of a desktop card printer in accordance with the principles of the present invention.

FIG. 1 shows an exemplary embodiment of a desktop card printer 10 in accordance with the principles of the present invention. As may be seen therefrom, the desktop card printer 10 is a generally self-contained unit. As such, it may be used as a peripheral to a desktop computer or similar device in a "desktop" environment, similarly to other peripherals such as scanners, etc. However, although the desktop card printer 10 is suited particularly to the desktop environment, it is not otherwise particularly limited in terms of its structure or application.

Figure 2:
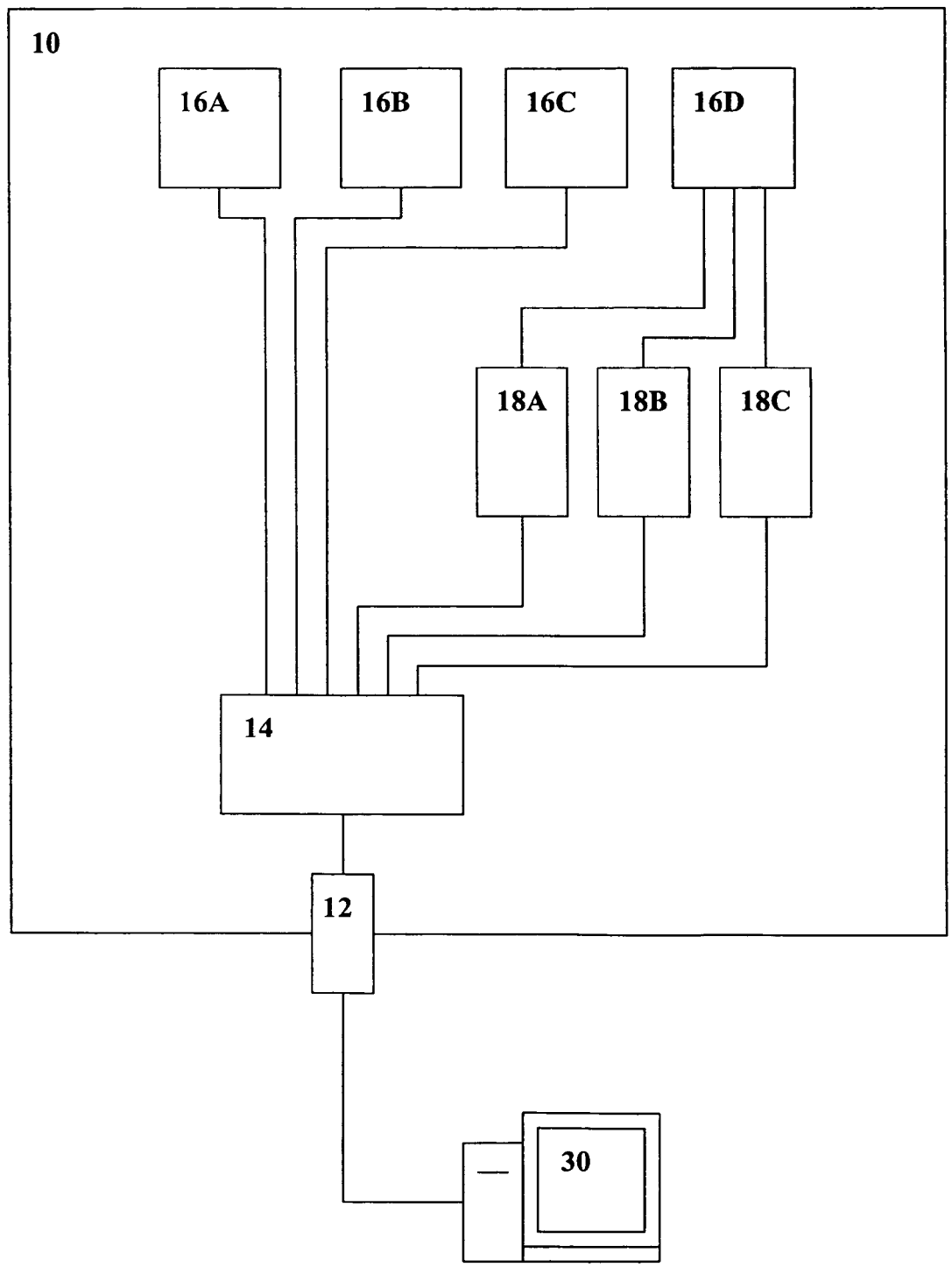
FIG. 2 shows a schematic representation of an exemplary embodiment of a desktop card printer in accordance with the principles of the present invention.

FIG. 2 shows a schematic representation of an exemplary embodiment of a desktop card printer 10 in accordance with the principles of the present invention.

As may be seen therein, the desktop card printer 10 includes an external communication link 12, a controller 14, and at least one data writer 16.

The external communication link 12 enables communication with devices external to the printer 10. For example, as illustrated, the printer 10 is connected to a host computer 30 by way of the external communication link 12. In such an arrangement, the host computer 30 may serve as a convenient interface with the printer 10.

For example, the host 30 may be used to conveniently input data regarding the printing to be done, such as the number, color, and placement of images or other data. Such data is then relayed to the printer 10 via the external communication link 12. Likewise, data from the printer 10, such as error messages, notification that a particular print job is complete, etc., may be relayed to the host 30 via the external communication link 12.

However, neither the printer 10 nor the external communication link 12 are limited only to connection with a host computer 30.

A variety of connections may be suitable for use as the external communication link 12. With regard to the physical structure of the link, Ethernet and USB ports are known to be useful as external communication link 12. However, this is exemplary only, and other links may be equally suitable.

In particular, although the external communication link 12 is shown with a wire link to the host 30, an external communication link 12 utilizing wireless communication may be equally suitable. It is noted that the term "external" when used herein with regard to the external communication link 12 refers to external communication, that is, communication into or out of the desktop card printer 10. Although the external communication link 12 also may be external in the sense that they are on the outside of the printer 10, this is not required. For example, with some forms of wireless communication the external communication link 12 may be fully enclosed within the printer 10, rather than reaching the exterior of the printer 10.

Suitable external communication links are known per se, and are not described further herein.

The controller 14 is in communication with the external communication link 12. Thus, data may be sent and received by the controller 14 to and from the host 30 or another external entity via the link 12.

Preferably, the controller 14 is a multi-platform standardized PDL (Page Description Language) controller. That is, it is preferable that the controller 14 can send and/or receive commands using a standardized PDL that is usable on more than one type of computer system.

In some embodiments of the desktop card printer 10, the controller 14 may be a multi-platform standardized PDL controller by virtue of its physical structure. That is, the controller 14 may be constructed specifically to utilize a multi-platform standardized PDL, and/or the PDL may be permanently and unalterably embedded within the controller 14.

However, this is not required. A controller 14 that has a suitable PDL embedded therein as firmware, or that loads such a PDL as software in order to control the desktop card printer 10, may be equally suitable. It is emphasized that for the purposes of the present invention, such a controller 14 is still considered to be a multi-platform standardized PDL controller, even if it is not structurally identifiable as such. It is sufficient that that controller sends and/or receives information in a multi-platform standardized form.

Some embodiments of a desktop card printer 10 in accordance with the principles of the present invention may use a semiconductor chip as a controller 14. However, this is exemplary only, and other controllers may be equally suitable.

In a preferred embodiment, the controller 14 has a multi-platform standardized PDL protocol embedded therein as firmware, in ROM (Read Only Memory). Such an arrangement does not require a job-specific controller to be designed and constructed only for PDL use. In addition, when embedded as firmware the PDL is relatively stable; for example, ROM is non-volatile, and so the data comprising the PDL is resistant to accidental loss or modification when stored therein.

In the case wherein the controller 14 has the PDL embedded in ROM thereof as firmware, it also is preferred that the ROM be PROM (Programmable Read Only Memory), so that the firmware instructions comprising the PDL can be updated, modified, or expanded if necessary.

In a more preferred embodiment, the controller is a PCL® (Printer Control Language) controller. PCL® is a registered trademark of Hewlett-Packard. PCL® is an example of a multi-platform standardized PDL.

In a still more preferred embodiment, an extended version of PCL® is used; that is, extensions are used in conjunction with the base version of PCL® to enable functions not available in the base version of PCL®. It is noted that PCL® is employed to control paper printers, and as of the filing date of this application it does not provide for at least some functions of the present invention. For example, as of the filing date of this application PCL® does not provide for the use of magnetic write heads or smart card contacts as data writers. This feature thus is not available using the base version of PCL®. Extensions that enable this and other features may be utilized by the controller 14 so as to provide additional functionality that is required or desirable in the desktop card printer 10.

PDLs and PCL® are known per se, and are not further described herein.

It is also preferred that the controller 14 is a Telnet device. That is, the controller 14 has Telnet embedded therein, so that information may be transmitted to and from the controller 14 (for example via the external communication link 12) using Telnet protocols.

As with the use of a PDL, the manner in which the controller 14 has Telnet made available to it is not particularly limited. Telnet protocols may be incorporated into the structure of the controller 14, into firmware therein, or as software therein. Any such controller 14 may be considered a Telnet controller for purposes of this application, so long as it provides Telnet functionality.

Telnet enables convenient connection of the desktop card printer 10 with a network. Thus, several hosts 30 might have access to a single desktop card printer 10, and likewise several desktop card printers 10 might be accessed by a single host 30. In addition, Telnet enables remote access to a desktop card printer 10 that is on such a network from substantially any place the network itself may be accessed.

Figure 5:
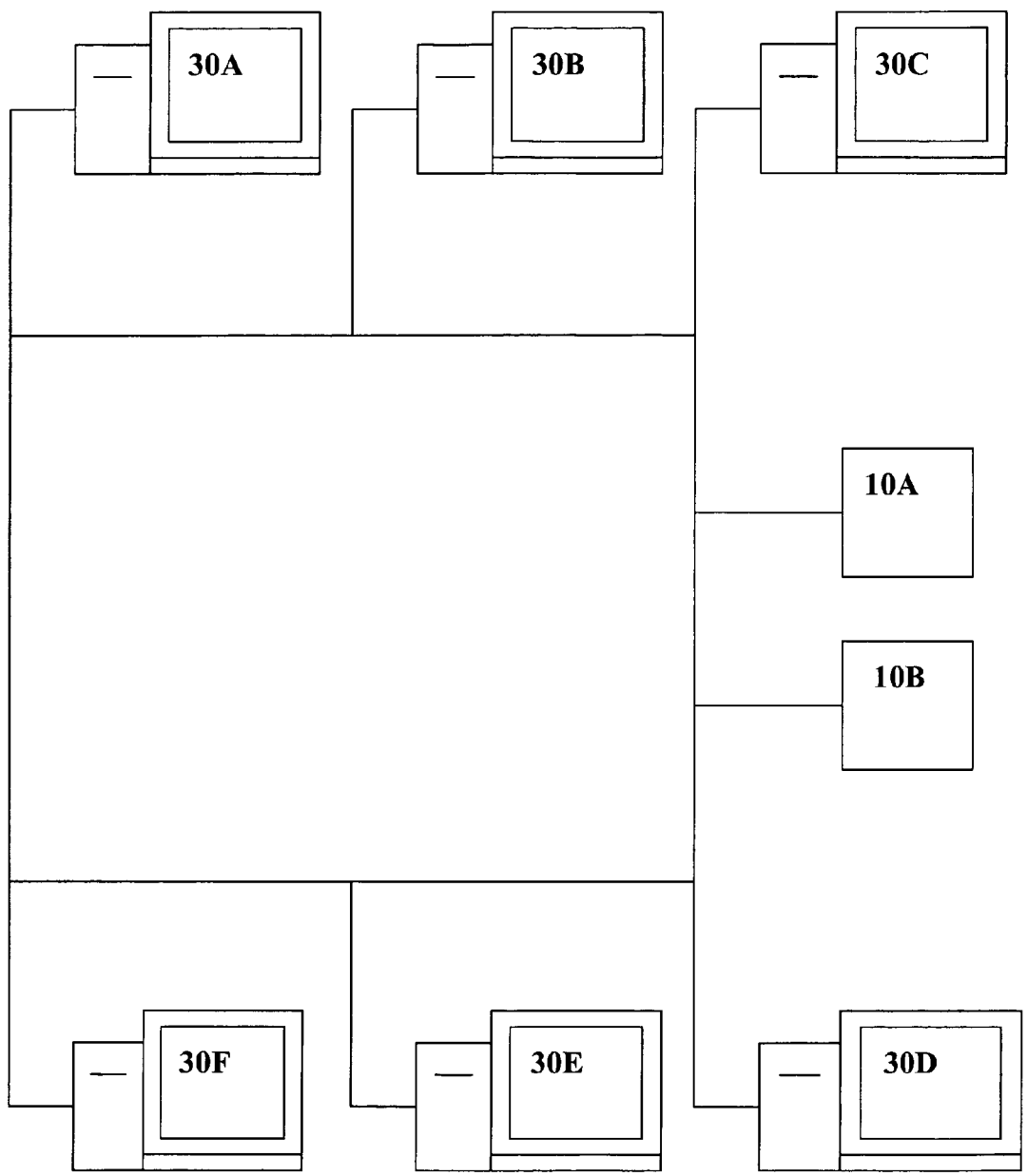
FIG. 5 illustrates an exemplary network of hosts and card printers.

FIG. 5 shows one such network. Therein, six hosts 30A through 30F are linked together in a network along with two desktop card printers 10A and 10B. In such an arrangement, any of the six hosts 30A through 30F can access and print with either of the desktop card printers 10A and 10B. However, this arrangement is exemplary only. Networks and the arrangement of desktop card printers 10 within them may vary widely.

Returning to FIG. 2, the controller 14 is in communication with at least one data writer 16. As illustrated in FIG. 2, the controller is in communication with four data writers 16A, 16B, 16C, and 16D, although this is exemplary only.

It is noted that communication between the controller 14 and data writers 16 need not be direct. For example, as shown the controller 14 is in communication with data writer 16D via couplers 18A, 18B, and 18C. The couplers 18 are described in more detail below.

The controller 14 controls the data output of the data writers 16, and hence controls what data eventually is deposited on a card passing through the printer 10. As noted above, the controller 14 is in communication with the external communication link 12, so that data may in turn be provided to the controller 14.

As noted previously, a card printer 10 in accordance with the principles of the present invention is not limited only to visible printing of graphics or text. Rather, substantially any form of data may be deposited on or in a card. Likewise, for the purposes of the present invention, a data writer 16 may be substantially any device that writes data either to the surface of a card or into some data storage system within the card. Data writers 16 are not particularly limited as to structure, manner of operation, or type of data written.

Suitable data writers 16 include, but are not limited to, print heads, magnetic write heads, and smart card contacts.

The type of data writers 16 in a desktop card printer 10 in accordance with the principles of the present invention determine the sort of data that may be written. For example, print heads typically print text, graphics, or other data such as bar codes on exposed card surfaces. Magnetic write heads typically record data on stripes of magnetic material applied to the surface of a card, or encapsulated within the card. Smart card contacts typically record data on computer chips attached to or embedded within a card.

A desktop card printer 10 in accordance with the principles of the present invention may include any or all of the above types of data writer 16, and/or data writers 16 not specifically described herein.

In addition, a particular embodiment of the desktop card printer 10 may include multiple data writers 16 of a particular type. In such instance, those data writers 16 may be identical, or they may differ from one another.

For example, a particular printer 10 may include as data writers 16 both a color print head, such as one that prints in CYM (cyan-yellow-magenta) format, and a black-and-white print head that prints only in black.

This specific arrangement may be of particular interest with regard to card printing, since the inks used for printing onto many card materials (such as various plastics) interact in ways that may be non-intuitive. For example, for media such as paper CYM printing can produce black by combining cyan, yellow, and magenta inks. However, in card printing this will not necessarily be the case; even if the resulting combination may be considered to be black upon inspection, the print quality produced may differ significantly from that produced by printing with a black ink.

As another example, the printer 10 may include as data writers 16 print heads that print in different modes. The printer may include a first mode print head may be a dye sublimation print head. Such a print head deposits dyes on the surface of a card, and the dyes penetrate into the card material, typically (though not necessarily) with the application of heat. The printer 10 also may include, in addition to the dye sublimation print head, a resin print head as a second mode print head. A resin print head deposits colored resin onto the surface of a card; the resin typically fuses to the surface with the application of heat, but does not penetrate into the card material.

Even if the printing produced by the two print heads were visually identical, a printer 10 might include different print heads for printing in different modes if the resulting image had different non-visual properties. For example, dyes that cannot be read by a bar-code reader might be used to produce a visible image, which resin that can be used might be used to produce bar codes. With such a combination, the resin-printed bar code could be easily read by a bar code reader even if a visible dye image were also present, perhaps even overlapping the bar code itself.

Likewise, a desktop card printer 10 in accordance with the principles of the present invention may include as data writers 16 both an analog magnetic write head and a digital magnetic write head. With such an arrangement, analog data could be written to magnetic stripes on some cards, while digital data might be written to other cards. Alternatively, both analog and digital data might be written to a single card.

Similarly, a desktop card printer 10 might include as data writers 16 two or more types of smart card contact. For example, the smart card chips in some smart cards are designed to receive data through direct electrical contacts on the card surface, and a contact suitable for writing data to such cards might be included in the printer 10 as a data writer 16. However, the chips in other smart cards are designed to receive data wirelessly, i.e. via radio waves.

Thus, a radio antenna also might be included as a data writer 16 in order to write data to the chips in such cards.

Returning to FIG. 2, a desktop card printer 10 in accordance with the principles of the present invention may include one or more data couplers 18 in communication with the controller 14 and a data writer 16, such that the controller 14 controls the data output of the data writer 16 via a coupler 18. As illustrated, the printer 10 of FIG. 2 includes three couplers 18A, 18B, and 18C, each in communication with the controller 14, and each also in communication with one of the data writers 16D.

A coupler 18 converts instructions from one form used—such as the form used by the controller 14—into another form that is used by the data writer 16.

As shown, some data writers 16 in a given printer 10 may utilize couplers 18, while others may not. Among the data writers 16 referenced herein, smart card contacts are most likely to utilize couplers 18. The type, number, and methods of communication of smart card chips varies considerably from chip to chip, and hence from card to card. This is at least in part because of the versatility of smart cards and their chips; since the purposes for which a smart card can be used may vary greatly, the system used to program the chips themselves also may vary greatly. In addition, smart card chips may be provided by third parties, and third party devices—i.e. couplers 16—may be necessary to write data to those chips.

Thus, in order to provide flexibility of use, it may be desirable to include multiple couplers 18 in a printer 10. These couplers 18 typically will be utilized in communication between the controller 14 and smart card contacts. However, communication between the controller 14 and a smart card contact does not necessarily require couplers 18. Likewise, couplers 18 also might be used in communication between the controller 14 and other types of data writers 16.

Figure 3:
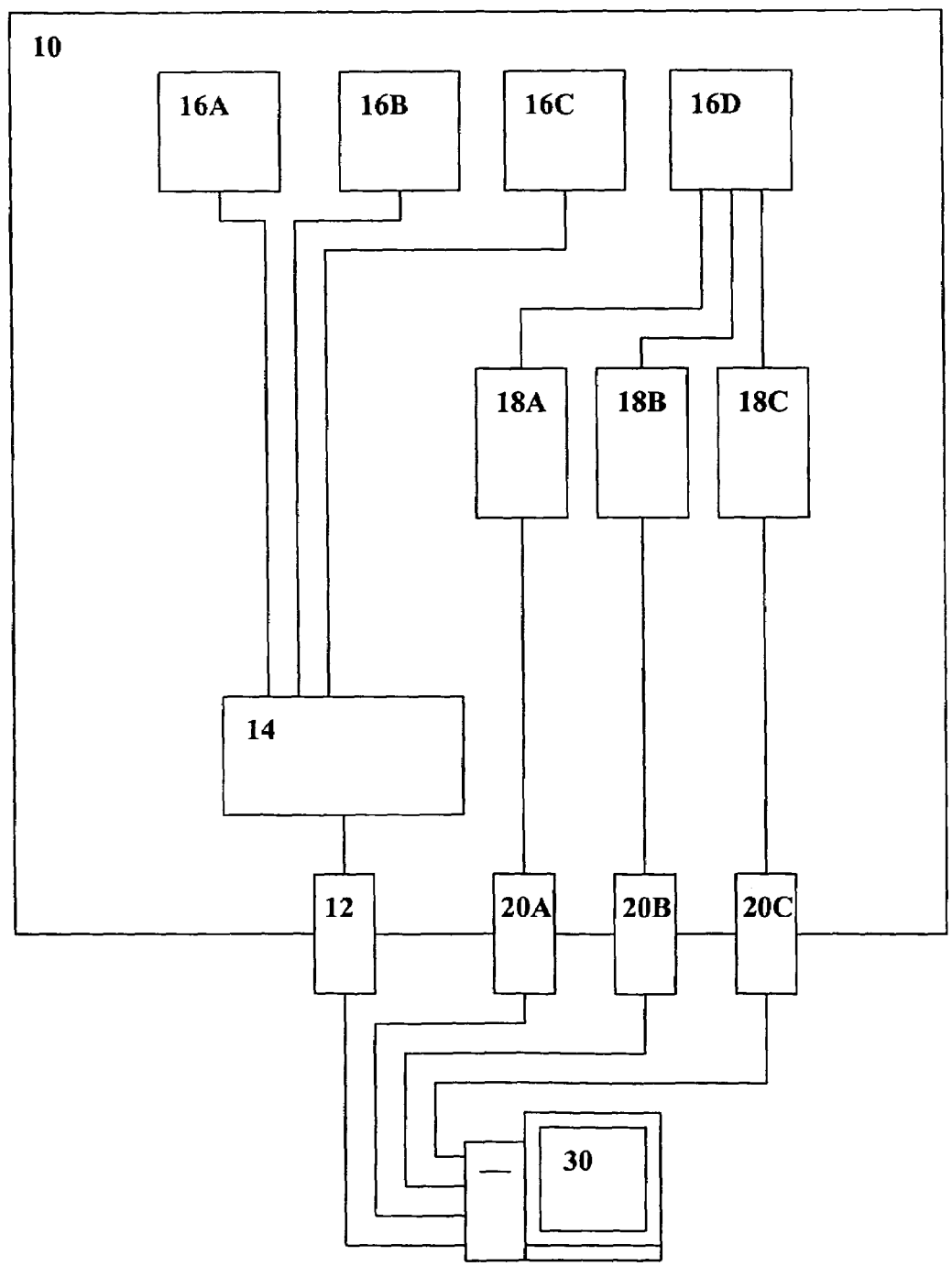
FIG. 3 shows a schematic representation of another exemplary embodiment of a desktop card printer in accordance with the principles of the present invention.

As shown in FIG. 3, communication with the a data writer 16 that utilizes couplers 18 will not necessarily involve the controller 14. In the arrangement shown in FIG. 3, couplers 18A, 18B, and 18C are each in communication with data writer 16D, but are not in communication with the controller 14. Instead, couplers 18A, 18B, and 18C are in communication with coupler communication links 20A, 20B, and 20C, respectively. Coupler communication links 20A, 20B, and 20C in turn are in communication with the host 30.

As previously noted, couplers 18 typically are used with a smart card contacts. In the case illustrated in FIG. 3, data for data writer 16D bypasses the controller 14. This may be advantageous when, for example, the data to be written to the card is merely digital information that is "dumped" into a smart card chip, without needing to be processed by the controller 14. However, such an arrangement is exemplary only.

Coupler communication links 20 are somewhat similar to the external communication link 12, in that they enable communication with devices external to the printer 10. As with the external communication link 12, the coupler communication links 20 not are limited only to connection with a host computer 30.

A variety of connections may be suitable for use as the coupler communication links 20. USB ports are known to be useful as coupler communication links 20. However, this is exemplary only, and other links may be equally suitable.

As may be seen in FIG. 3, the embodiment of a desktop card printer 10 therein has a total of four communication links: an external communication link 12, and three coupler communication links 20. Although, as noted above, there may be advantages in having multiple couplers 18, and/or in having coupler communication links 20 that bypass the controller 14, as the number of communication links increases the complexity of the printer 10 also increases, and the potential difficulty in properly connecting and maintaining connections with a host 30 or other external agent also increases.

In addition, as noted previously with regard to Ethernet connections, direct connections such as those shown in FIG. 3 between the host 30 and the external communication link 12 and coupler communication links 20 may be in some ways limited, at least with regard to access from a network. Individually converting direct connections, such as USB connections, into network-capable connections, such as Ethernet connections, can increase complexity still further.

Figure 4:
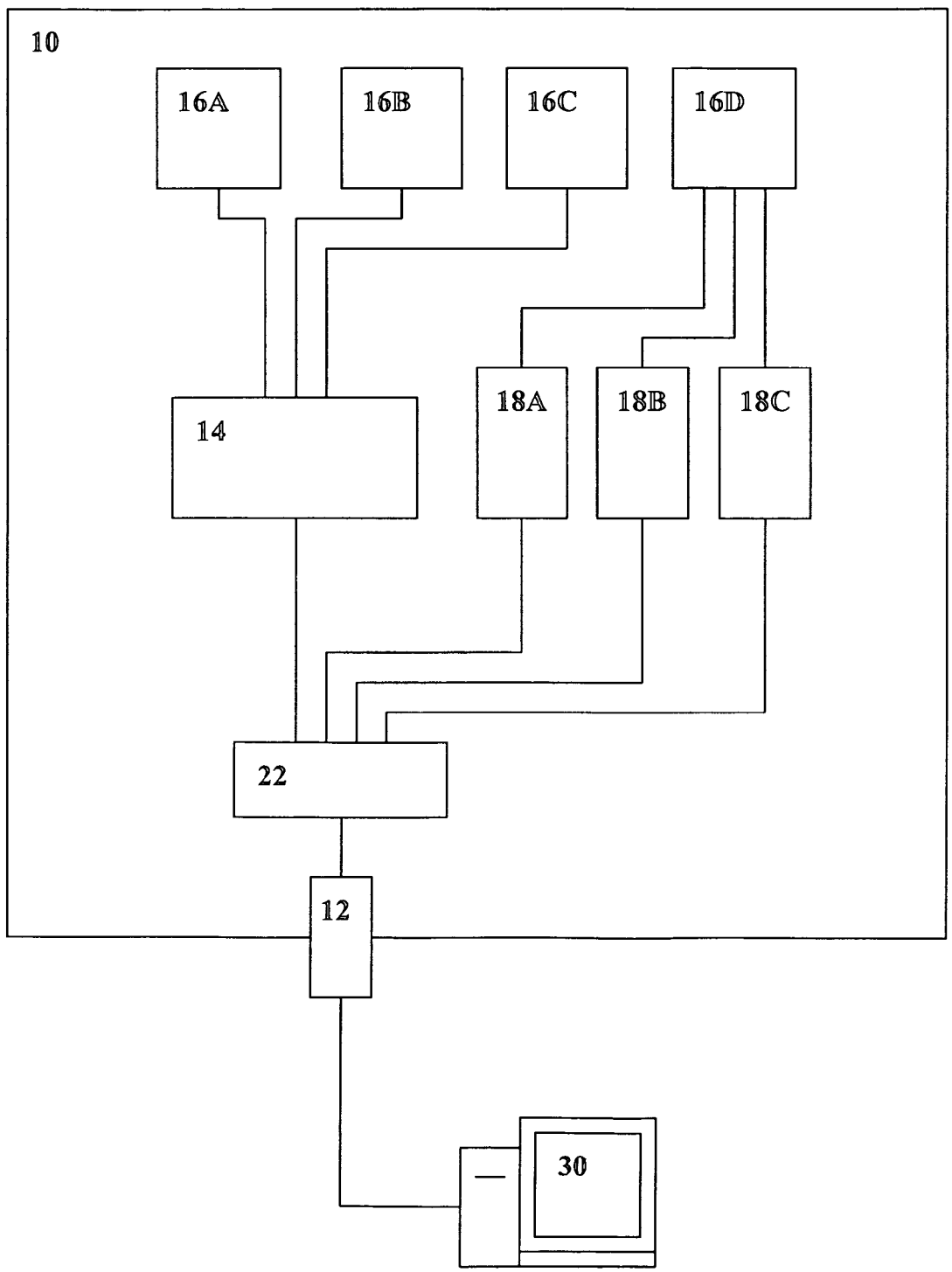
FIG. 4 shows a schematic representation of yet another exemplary embodiment of a desktop card printer in accordance with the principles of the present invention.

Thus, as shown in FIG. 4, certain embodiments of a desktop card printer 10 in accordance with the principles of the present invention may include an internal USB hub 22. In the embodiment shown therein, the printer 10 connects to a host 30 via an external communication link 12.

The external communication link 12 is in communication with the controller 14. Thus, the controller 14 is in communication with the external communication link 12 as in FIGS. 2 and 3, but via the internal USB hub 22.

The internal USB hub 22 also is in communication with three couplers 18A, 18B, and 18C. As in FIG. 3, communication with the couplers 18 bypasses the controller 14. However, because the printer 10 includes an internal USB port 22, the couplers 18 do not require separate connections with the host 30, and the connection between the printer 10 and the host 30 is simplified thereby.

The USB hub 22 is internal to the printer 10. It is not a separate device, and therefore does not require additional external connections to be made between it and the printer 10. However, the USB hub 22 may be essentially a self-contained device disposed within the printer 10. Alternatively, the USB hub 22 may be fully integrated into the printer 10, such that it may share circuit boards, grounds, a power supply, etc.

USB hubs are known per se, and are not further described herein.

In a preferred embodiment of a desktop card printer 10 in accordance with the principles of the present invention, decision-making and data-processing are primarily or entirely internal to the printer 10. That is, image processing and decision-making immediately related to printing is performed within the printer 10 itself, typically within the processor 14. Thus, once the processor 14 receives a print command, i.e. from the host 30, further input is not required.

For example, if a color image is sent for printing from the host 30 to the printer 10, the controller 14 itself determines which data writer(s) 16 should be used to produce an appropriate color image on a card, and what parameters (i.e. image scale) should be used for printing the image. The host 30 does not need to "know" or determine whether there is a suitable data writer 16 in order for printing to take place. Likewise, the host 30 does not need to process the image data into a form suitable for the data writer(s) 16 that are used for writing the data. Once the host 30 initiates printing, printer 10 itself handles the necessary processing, and prints the image.

Such internal processing is not limited only to the above examples. Depending on the details of a particular embodiment of the desktop card printer 10, the processor 14 may perform other sorts of image processing before or during printing. Other processing not specifically described herein also may be performed.

Image processing per se is known, and is not described further herein.

In addition to performing processing operations, printing in a desktop card printer 10 in accordance with the principles of the present invention may include decision-making.

For example, when data is sent from the host 30 to the printer 10 for writing onto a card, the controller 14 itself determines which data writer(s) 16 are most appropriate for writing the data.

In some cases, this may be a matter of selecting a data writer 16 based on the medium of the data in question, for example selecting a magnetic write head for use when writing data to a magnetic stripe.

However, such decisions may be somewhat more subtle. For example, as noted previously the combination of cyan, yellow, and magenta inks in CYM color printing on a card may not produce an equivalent image to one made using black ink. In such instance, the processor 14 may select whether to print using a CYM color print head, or with a black and white print head, depending on the effect that is to be produced.

Similarly, if a CYMK print head is used, the processor 14 may control the print head itself in detail, selecting which portions of an image are to be printed thereby using a combination of cyan, yellow, and magenta and which portions are to be printed in black.

Likewise, the processor 14 may select which of several print heads to use for a particular type of image. For example, as noted previously, bar codes may preferably be printed using a resin print head, rather than a dye sublimation print head.

Thus, decision-making may include selecting a single data writer 16 from among several to perform an entire print job. In such case, the printer 10 may select a data writer 16 with the controller 14, and command the selected data writer 16 with the controller 14 so as to write data to the card using the selected data writer 16.

However, selection also may include selecting two or more data writers 16 to each perform a portion of a print job. In such case, the printer 10 may select first and second data writers 16 with the controller 14, and command the selected data writers 16 with the controller 14 so as to selectively write data to the card using the selected data writers 16, some of the data being written by the first data writer, and some of the data being written by the second data writer.

It will be understood that such decision-making is not limited to only two data writers 16, but may encompass essentially any number of data writers 16, either of the same or of different types.

In addition, decision making in the printer 10 is not limited only to selection of data writers 16. Where two or more couplers 18 are available for use with a particular data writer 16, the controller 14 may determine which coupler 18 is most appropriate for communicating the data to the appropriate data writer 16.

As with image processing, decision making in a desktop card printer 10 in accordance with the principles of the present invention is not limited only to the examples provided herein.

Because processing and decision-making are performed within the printer 10, the demands placed on the host 30 are relatively few.

Such an arrangement does not necessarily preclude input from a host 30 that would affect processing and decision making. However, such input is not required.

As described previously, in a desktop card printer 10 in accordance with the principles of the present invention the controller 14 is a PCL® controller, using an extended version of PCL®. Extensions may be used to enable some or all of the processing and decision making functionality described above.

The base version of PCL®, being employed to control paper printers, does not enable functions that would not be used by a paper printer. For example, neither magnetic stripes nor smart card chips are conventionally utilized in paper printing, and the use of multiple print heads is limited at best. At the time this application is filed the base version of PCL® does not include features to enable writing of magnetic data to a magnetic stripe or smart card data to a smart card chip, and provides little or no support for the use of multiple print heads to print data. Moreover, at the time this application is filed the base version of PCL® also does not include a mechanism for making a decision to write magnetic data or smart card data, and provides little or nothing in the way of a mechanism for selecting from among multiple print heads.

It is specifically noted that extensions may be used, therefore, for performing at least the image processing and decision-making operations described above. However, the present invention is not limited only to those extensions specifically identified herein, or to extensions only for image processing and decision-making.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A desktop card printer for printing data onto cards, comprising:
   an external communication link enabling communications with a device external to the card printer;
   a controller within the printer in communication with the communication link;
   a USB hub internal to said printer;
   at least one data writer configured to write data onto the cards; and
   a plurality of data couplers connected between the data writer and the USB hub providing communications between the data writer and the USB hub.

2. A desktop card printer according to claim 1, wherein said USB hub is electronically integrated therein.

3. A desktop card printer according to claim 1, wherein the data writer comprises a smart card contact and the data couplers comprise smart card data couplers, and
   wherein a selected one of said couplers controls a data output of said contact, and said one of said couplers is selectable via said USB hub.

4. A desktop card printer according to claim 1, wherein the data couplers convert instructions from a form used by the USB hub to a form used by the data writer.

5. A desktop card printer for printing data onto plastic cards, comprising:
   an external communication link enabling communications with a device external to the card printer;
   a controller within the printer in communication with the communication link;
   at least one data writer configured to write data onto the cards; and
   a plurality of data couplers connected between the data writer and the controller providing communications between the data writer and the controller.

6. A desktop card printer according to claim 5, wherein the data writer comprises a smart card contact and the data couplers comprise smart card data couplers, and wherein a selected one of said couplers controls a data output of said contact, and said one of said couplers is selectable via said controller.

7. A desktop card printer according to claim 5, wherein the data couplers convert instructions from a form used by the controller to a form used by the data writer.

8. A desktop card printer for printing data onto plastic cards, comprising:
- a plurality of external communication links enabling communications with a device external to the card printer;
- a controller within the printer in communication with at least one of the communication links;
- at least one data writer configured to write data onto the cards; and
- a plurality of data couplers connected between the data writer and a plurality of the external communication links providing communications between the data writer and the external device.

9. A desktop card printer according to claim 8, wherein the data writer comprises a smart card contact and the data couplers comprise smart card data couplers, and wherein a selected one of said couplers controls a data output of said contact, and said one of said couplers is selectable via the external device.

10. A desktop card printer according to claim 8, wherein the data couplers convert instructions from a form used by the external device to a form used by the data writer.

* * * * *